July 31, 1956 S. ALCORN 2,757,041
DEMOUNTABLE TRUCK BODY COVER WITH HINGED PORTIONS
Filed May 10, 1954 2 Sheets-Sheet 1

INVENTOR.
Sydney Alcorn

July 31, 1956 S. ALCORN 2,757,041
DEMOUNTABLE TRUCK BODY COVER WITH HINGED PORTIONS
Filed May 10, 1954 2 Sheets—Sheet 2
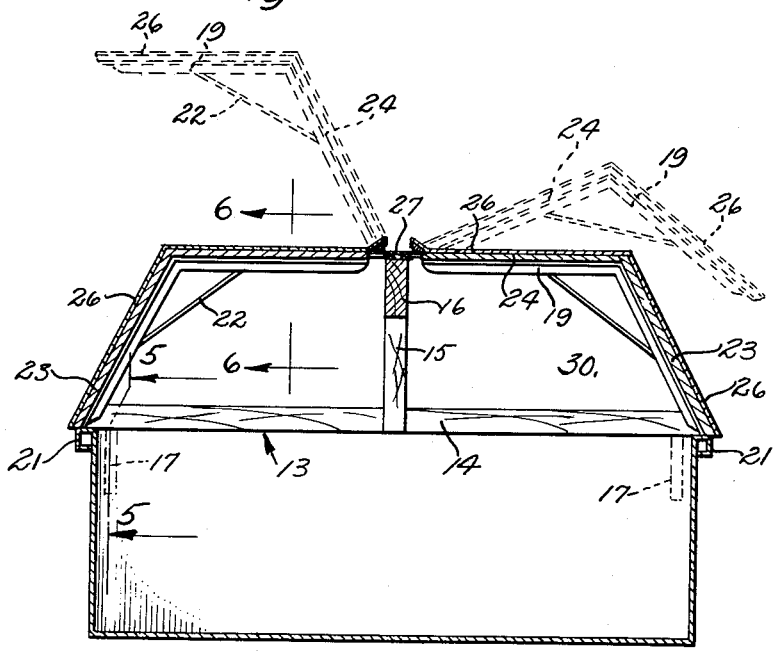
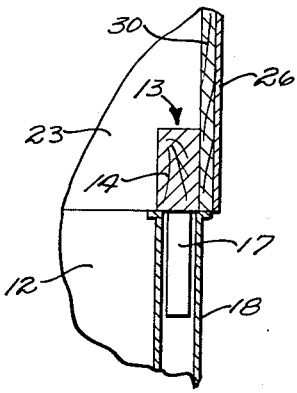
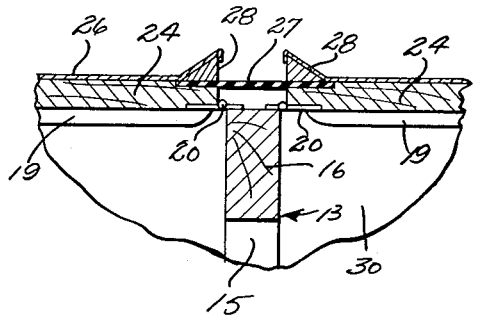
INVENTOR.
Sydney Alcorn United States Patent Office 2,757,041
Patented July 31, 1956

2,757,041

DEMOUNTABLE TRUCK BODY COVER WITH HINGED PORTIONS

Sydney Alcorn, Williamsville, N. Y.

Application May 10, 1954, Serial No. 428,673

1 Claim. (Cl. 296—100)

This invention relates to truck or vehicle bodies.

It is an object of the present invention to provide a truck body which is completely enclosed, permitting items to be carried therein completely protected from the weather.

It is another object of the present invention to provide a truck body of the above type which will permit easy and ready access to the items carried therein in the same manner as if the body were not enclosed.

It is still another object of the present invention to provide a truck of the above type wherein access may be had to the items contained therein while standing on the ground and which eliminates the necessity of having to climb into the truck body.

It is still another object of the present invention to provide a truck body of the above type wherein the top wall thereof is not upwardly extended beyond the rear window of the truck cab, permitting clear visibility for parking and other purposes.

It is still another object of the present invention to provide a truck body of the above type which may be easily and readily removed from the truck when it is desired to use the latter for bulkier loadings.

Other objects of the present invention are to provide a truck body bearing the above objects in mind which is of simple construction, inexpensive to manufacture, has a minimum number of parts, is easy to use and efficient in operation.

For other objects and a better understanding of the invention, reference may be had to the following detailed description taken in connection with the accompanying drawing, in which:

Fig. 3 is a vertical sectional view taken along the line 3—3 of Fig. 2, and showing the top and sides of the invention in phantom in a raised position;

Fig. 4 is a vertical sectional view taken along the line 4—4 of Fig. 1;

Fig. 5 is a vertical sectional view taken along the line 5—5 of Fig. 3; and

Figure 1:
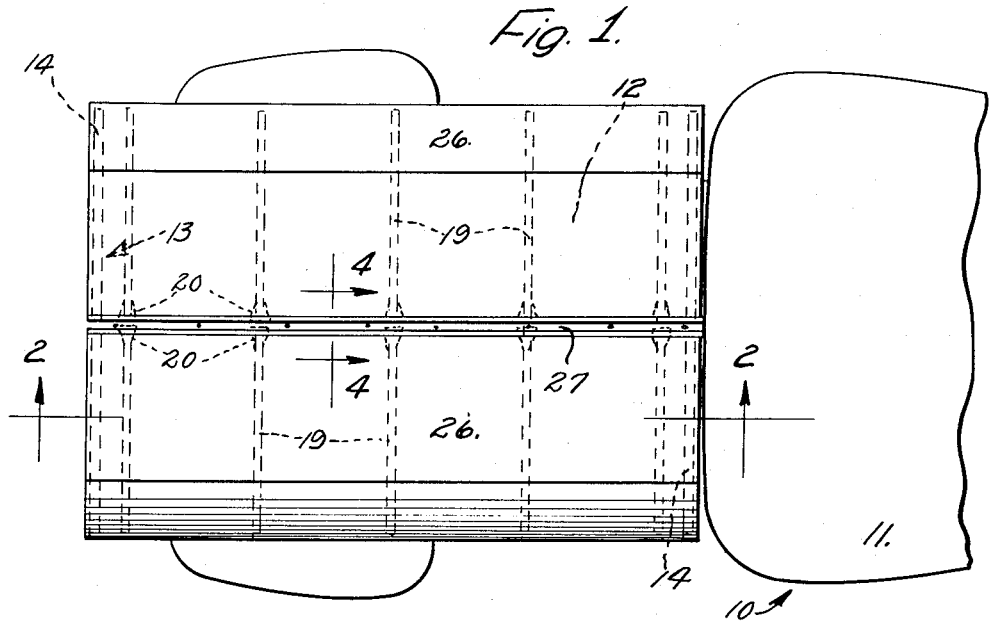
Figure 1 is a fragmentary top plan view of a truck showing the invention incorporated thereon.

Referring now more in detail to the drawing, there is indicated generally at 10 a truck having a cab 11 and a pick up compartment 12, substantially as illustrated.

Figure 2:
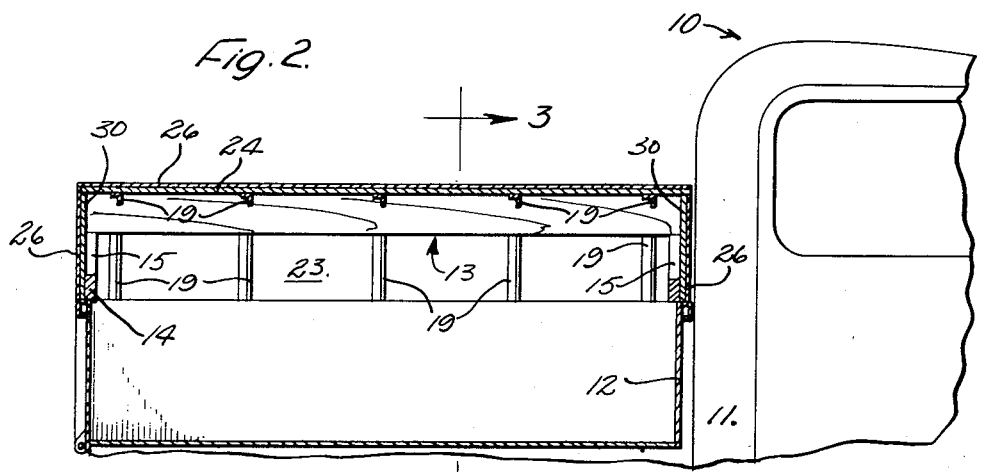
Fig. 2 is a vertical sectional view taken along the line 2—2 of Fig. 1.

In the practice of my invention, a framework indicated generally at 13 is removably mounted at each corner at the top of the rear truck compartment 12, the framework 13 including the end transverse members 14. Vertical members 15 (Figs. 2 and 3) are secured to the center of the end transverse members 14 and support the opposite ends of a longitudinal member 16. Male members 17 are secured to the undersurface of the transverse members 14 at each end thereof and are received within the female portions 18 of the rear compartment 12 (Fig. 5), the weight of the frame 13 retaining the latter in position on the truck while at the same time permitting its ready removal when it is desired to use the truck for bulkier loads.

Figure 6:
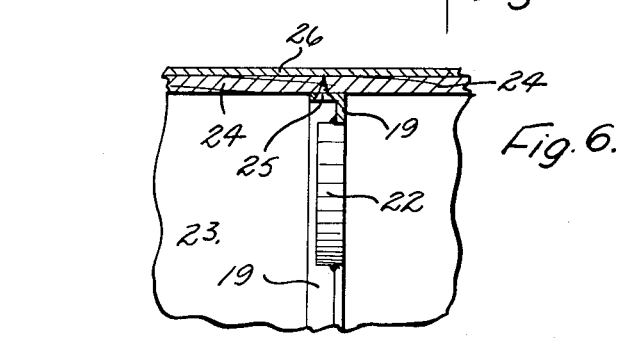
Fig. 6 is a vertical sectional view taken along the line 6—6 of Fig. 3.

A plurality of angle brackets 19 of V-shaped configuration are pivotally connected to the upper longitudinal edges of the longitudinal member 16 at longitudinally spaced intervals by means of the hinges 20 (Fig. 4), the lower ends of the angle brackets resting on the upper edge 21 of the rear compartment 12 as shown in Fig. 3. Flat braces 22 (Fig. 3) are welded or otherwise secured at opposite ends to the brackets 19 whereby to reinforce the latter. Plywood sides 23 and plywood tops 24 are secured to the angle brackets 19 by means of screws 25 (Fig. 6) sheet aluminum 26 being secured to the outer faces of the plywood 23, 24.

As shown in Fig. 4, the adjacent longitudinal edges of the tops 24 are freely spaced from each other and are provided along their upper surface with grooves which receive therein a unitary strip of rubber 27 or the like secured in position by molding 28 secured to the tops 24. It will be noted that the aluminum sheet 26 continues across the molding 28 and downwardly across the portion of the inner vertical faces of the latter.

The structure is completed by the trapezoidal shaped plywood ends 30 secured across the outside of the transverse members 14 (Fig. 2) and covered with the aluminum sheet 26.

It will be noted that the aluminum 26 goes over the adjacent faces of the molding 28 and prevents the rain water from running directly into the rubber valley 27. Thus, the device is waterproof in all respects, while at the same time permitting easy and ready access to items contained within the rear truck compartment 12, while standing on the ground. It will also be noted that the top of the device terminates below the rear window of the cab 11, permitting visibility for parking and reverse driving.

While various changes may be made in the detail construction, it shall be understood that such changes shall be within the spirit and scope of the present invention, as defined by the appended claim.

What I claim as new and desire to protect by Letters Patent of the United States is:

In a rectangular compartment open at the top a pair of transverse separable frame members at opposite ends of the compartment, vertical, upwardly extending frame members connected to each of said transverse members at the centers thereof, a longitudinal frame member connected at opposite ends to the upper ends of said vertical members, depending male members secured to the opposite ends of said transverse members, complementary female members connected to said compartment at the corners thereof and adapted to receive said male members substantially trapezoidal shaped end members connected to the outsides of said transverse members, symmetrical integrally connected top and side walls pivotally connected at their adjacent upper longitudinal edges to said longitudinal member, a plurality of substantially V-shaped braces pivotally connected at longitudinally spaced intervals at one end to the opposite upper longitudinal edges of said longitudinal member, the other ends of said V-shaped braces being adapted to rest on the upper edges of said compartment, said integrally connected top and side portions being secured across the outside of said V-shaped braces, elongated flexible waterproof material disposed across the adjacent longitudinal edges of said top portions, and molding secured across the upper surface of said top portion securing said flexible waterproof material therebelow, said molding being of substantially triangular cross section and being inclined downwardly toward said top portion whereby to conduct the water away from said flexible material.

References Cited in the file of this patent

UNITED STATES PATENTS

| | | |
|---|---|---|
| 739,012 | Lehr | Sept. 15, 1903 |
| 1,080,948 | Bigbie | Dec. 9, 1913 |
| 1,781,713 | Williams | Nov. 18, 1930 |
| 1,955,807 | Heil | Apr. 24, 1934 |
| 2,535,242 | Stuart | Dec. 26, 1950 |

FOREIGN PATENTS

| | | |
|---|---|---|
| 337,167 | Great Britain | Oct. 30, 1930 |